(12) United States Patent
Reihl

(10) Patent No.: US 8,250,881 B1
(45) Date of Patent: Aug. 28, 2012

(54) METHOD AND APPARATUS FOR CONTROLLING TEMPERATURE OF A TEMPERATURE MAINTENANCE STORAGE UNIT

(76) Inventor: Michael Reihl, Rosebush, MI (US)

( * ) Notice: Subject to any disclaimer, the term of this patent is extended or adjusted under 35 U.S.C. 154(b) by 74 days.

(21) Appl. No.: 12/780,331

(22) Filed: May 14, 2010

Related U.S. Application Data

(63) Continuation-in-part of application No. 11/709,666, filed on Feb. 22, 2007, now abandoned.

(60) Provisional application No. 60/860,332, filed on Nov. 21, 2006.

(51) Int. Cl.
*F25D 23/06* (2006.01)
*F25D 19/00* (2006.01)
*F25D 11/02* (2006.01)
*F25D 17/00* (2006.01)
*F25D 17/04* (2006.01)

(52) U.S. Cl. ............. 62/451; 62/180; 62/186; 62/441; 62/453

(58) Field of Classification Search .............. 62/441, 62/451, 453
See application file for complete search history.

(56) References Cited

U.S. PATENT DOCUMENTS

| | | | |
|---|---|---|---|
| 1,952,981 A | | 3/1934 | Frazier |
| 2,408,805 A | | 10/1946 | Millott et al. |
| 2,624,554 A | | 1/1953 | Morrison |
| 2,781,643 A | | 2/1957 | Fairweather |
| 2,959,939 A | | 11/1960 | Arzberger |
| 3,005,321 A | * | 10/1961 | Devery ............................ 62/186 |
| 3,455,119 A | | 7/1969 | Bright |
| 3,466,891 A | * | 9/1969 | Maxwell ........................... 62/419 |
| 3,893,307 A | * | 7/1975 | Jacobs ............................. 62/150 |
| 4,024,620 A | | 5/1977 | Torcomian |
| 4,248,061 A | | 2/1981 | Rousseau et al. |
| 4,355,521 A | * | 10/1982 | Tsai ................................ 62/196.4 |
| 4,452,051 A | | 6/1984 | Berger et al. |
| 4,612,774 A | | 9/1986 | Budreau |
| 4,936,106 A | * | 6/1990 | Beach et al. ...................... 62/131 |
| 5,081,850 A | | 1/1992 | Wakatsuki et al. |
| 5,097,897 A | | 3/1992 | Watanabe et al. |
| 5,272,887 A | * | 12/1993 | Zendzian, Sr. .................. 62/295 |
| 5,570,588 A | | 11/1996 | Lowe |
| 5,653,122 A | | 8/1997 | Anders et al. |
| 5,722,254 A | | 3/1998 | Roth et al. |

(Continued)

FOREIGN PATENT DOCUMENTS

JP 06026755 A * 2/1994

*Primary Examiner* — Ljiljana Ciric
*Assistant Examiner* — Filip Zec
(74) *Attorney, Agent, or Firm* — Gradner, Linn, Burkhart & Flory, LLP

(57) ABSTRACT

A temperature maintenance storage unit includes a fan assembly, an evaporator coil assembly, a compressor unit, and an interior within which goods may be stored, with the fan assembly configured to selectively generate air currents over the evaporator coil assembly and within the interior. The temperature maintenance storage unit further includes an insulation pack assembly comprising a sealed generally flexible insulation pack containing a temperature control fluid, an insulation thermostat and an interior thermostat, with the insulation thermostat monitoring the temperature of the insulation pack assembly and the interior thermostat monitoring the temperature of the interior. The insulation pack assembly being mounted directly to the evaporator coil assembly with the insulation thermostat selectively activating the fan assembly in response to monitored temperatures of the insulation pack assembly, and with the interior thermostat selectively activating the compressor unit in response to monitored temperatures of the interior.

18 Claims, 9 Drawing Sheets

U.S. PATENT DOCUMENTS

| | | |
|---|---|---|
| 5,964,101 A | 10/1999 | Schulak et al. |
| 6,083,256 A | 7/2000 | Der Ovanesian |
| 6,085,535 A | 7/2000 | Richmond et al. |
| 6,253,668 B1 | 7/2001 | Lee |
| 6,393,861 B1 | 5/2002 | Levenduski et al. |
| 6,427,473 B1 | 8/2002 | Kurokawa et al. |
| 6,619,070 B2 | 9/2003 | Shin |
| 6,666,045 B1 * | 12/2003 | Song .............................. 62/441 |
| 7,124,602 B2 | 10/2006 | Lee et al. |
| 2006/0032266 A1 | 2/2006 | Gagnon |
| 2006/0130491 A1 | 6/2006 | Park et al. |

\* cited by examiner

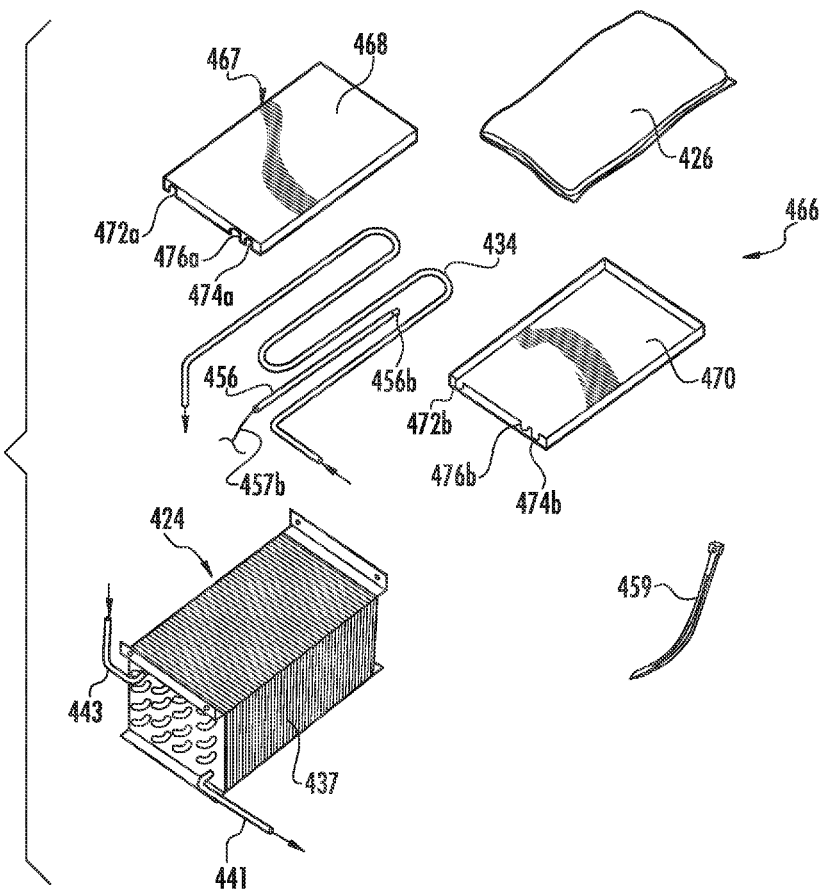
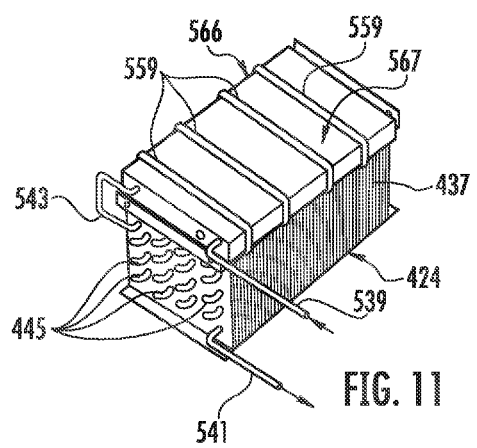

METHOD AND APPARATUS FOR CONTROLLING TEMPERATURE OF A TEMPERATURE MAINTENANCE STORAGE UNIT

CROSS REFERENCE TO RELATED APPLICATION

The present application is a continuation-in-part of U.S. nonprovisional patent application Ser. No. 11/709,666, filed Feb. 22, 2007, which claims the benefit of U.S. provisional patent application Ser. No. 60/860,332, filed Nov. 21, 2006, by Michael Reihl for METHOD AND APPARATUS FOR CONTROLLING TEMPERATURE OF A TEMPERATURE MAINTENANCE STORAGE UNIT, which are all hereby incorporated herein by reference in their entireties.

BACKGROUND OF THE INVENTION

The present invention is directed to an apparatus and method for controlling the temperature within a temperature maintenance storage unit used for storing and/or displaying various goods, and in particular is directed at a system for insulating a tank of a temperature maintenance unit for promoting uniform temperatures within the tank.

Temperature maintenance storage units are widely used for storing goods, such as food or drink items, medicines, and the like, and may be used and/or configured as a refrigeration system or as a heating system. Such storage units may include a tank having an open top such that the food and/or drink items contained therein may be readily accessible or displayed.

Conventional temperature maintenance storage units, such as a refrigeration unit, include refrigeration coils placed or wound about the tank opposite from the interior storage area of the tank. A refrigerant is conducted through the coils to cool the tank walls and, thus, the interior of the tank and the tank's contents.

Typically, however, the coils are only disposed about a limited surface area of the walls of the tank such that non-uniform cooling (or heating) of the tank walls occurs when refrigerant (or a heating fluid) is conducted through the coils. For example, the lower area or portion of the tank may be maintained at lower temperatures than the upper area or portion of the tank, which may cause freezing of goods, such as food/drink items, positioned at the lower area and inadequate cooling of those items positioned nearer to the upper area. Furthermore, items positioned in proximity to tank portions that are immediately adjacent a coil may experience localized spots of significantly lower temperatures as compared to other portions of the tank. Such uneven cooling (or heating) may cause damage to the goods contained in the tank.

Therefore, a temperature maintenance unit that avoids uneven cooling and/or heating is desired.

SUMMARY OF THE INVENTION

The present invention provides a temperature maintenance storage unit that may be constructed as a refrigeration unit or a heating unit for storing goods, such as food and drink items, medicines, and the like. According to an aspect of the present invention, a temperature maintenance storage unit, said temperature maintenance storage unit comprises a goods storage member including a fan assembly, an evaporator coil assembly, a compressor unit, and an interior within which goods may be stored, with the fan assembly configured to selectively generate air currents over the evaporator coil assembly and within the interior. The temperature maintenance storage unit further includes an insulation pack assembly comprising a sealed generally flexible insulation pack containing a temperature control fluid, an insulation thermostat and an interior thermostat, with the insulation thermostat monitoring the temperature of the insulation pack assembly and the interior thermostat monitoring the temperature of the interior. The insulation pack assembly being mounted directly to the evaporator coil assembly with the insulation thermostat selectively activating the fan assembly in response to monitored temperatures of the insulation pack assembly, and with the interior thermostat selectively activating the compressor unit in response to monitored temperatures of the interior.

In particular embodiments, the insulation pack assembly may include a diffuser housing within which an insulation pack is contained. A refrigerant line is conducted through the insulation pack assembly for cooling of the insulation pack and the insulation thermostat may include a temperature probe positioned within the diffuser housing. The diffuser housing may be constructed of a pair of housing members, with the insulation pack sandwiched there between.

According to another aspect of the present invention, a method of maintaining the temperature within a temperature maintenance storage unit comprises monitoring the temperature of an insulation pack assembly with an insulation thermostat, where the insulation pack assembly comprises a sealed generally flexible insulation pack containing a temperature control fluid with the insulation pack assembly being mounted directly to an evaporator coil assembly. The method further includes activating a compressor unit when the insulation thermostat detects a compressor activation temperature. Still further, the method includes monitoring the temperature of the interior of the goods storage member with an interior thermostat, and activating a fan assembly when the interior thermostat detects a fan activation temperature, with the fan assembly being selectively activated without activation of the compressor unit when the interior thermostat detects the fan activation temperature and the insulation thermostat detects a temperature below the compressor activation temperature.

The method may further include deactivating the compressor unit when the insulation thermostat detects a compressor deactivation temperature, and deactivating the fan assembly when the interior thermostat detects a fan deactivation temperature. In particular embodiments, the fan activation temperature is approximately 40 degrees F. and the compressor activation temperature is approximately 30 degrees F., with the fan deactivation temperature being approximately 36 degrees F. and the compressor deactivation temperature being approximately 18 degrees F.

The method may further include circulating refrigerant from the condensing unit through the insulation pack assembly, into the evaporator coil assembly, and back to the condensing unit when the compressor unit is activated. The insulation pack assembly may include a diffuser housing with the insulation pack being contained within the diffuser housing, with a refrigerant line extending into and out of the diffuser housing, with the insulation pack being in direct contact with the refrigerant line. The diffuser housing may comprise first and second housing members, with the insulation pack being contained between the housing members. In particular embodiments the evaporator coil assembly may include a plurality of fins with the diffuser housing being mounted directly to the fins. The insulation thermostat may include a temperature probe, with the temperature probe directly contacting the insulation pack in the step of monitoring the temperature of the insulation pack assembly.

According to still another aspect of the present invention, a temperature maintenance storage unit comprises a goods storage member including a fan assembly, an evaporator coil assembly, a compressor unit, and an interior within which goods may be stored, with the fan assembly configured to selectively generate air currents over the evaporator coil assembly and within the interior. The temperature maintenance storage unit further includes an insulation pack assembly comprising a diffuser housing and a sealed generally flexible insulation pack containing a temperature control fluid with the insulation pack being contained within the diffuser housing. Also included is an insulation thermostat, with the insulation thermostat including a thermostat probe positioned within the insulation pack assembly for monitoring the temperature of the insulation pack assembly, and an interior thermostat for monitoring the temperature of the interior. A refrigerant line extends from the condensing unit, through the insulation pack assembly, and to the evaporator coil assembly, with the refrigerant line contacting the insulation pack and conducting a refrigerant through the insulation pack assembly and to the evaporator coil. The diffuser housing being mounted directly to the evaporator coil assembly with the insulation thermostat selectively activating the fan assembly in response to monitored temperatures of the insulation pack assembly, and with the interior thermostat selectively activating the compressor unit in response to monitored temperatures of the interior.

In particular embodiments the evaporator coil assembly may include a plurality of fins and the diffuser housing is mounted directly to the fins. The diffuser housing may include a pair of housing members, with the insulation pack contained there between. A thermostat probe tube may extend into the insulation pack assembly for receiving of the thermostat probe.

The temperature maintenance storage unit of the present invention may be constructed as a refrigeration unit or a heating unit for storing goods, such as food and drink items. The temperature maintenance storage unit is provided with insulation packs containing a temperature control fluid, such as a gel, with the insulation packs being provided adjacent one or more of the sides of a tank of the temperature maintenance storage unit. Heating or cooling coils may be sandwiched between the insulation packs and tank and cause the temperature control fluid of the insulation packs to reach a generally uniform temperature. Because the insulation packs contact a significantly higher amount of surface area of the sides of the tank as compared to the coils, the insulation packs promote generally uniform temperatures within the interior of the tank such that food and/or drink items, or the like, stored or positioned within the tank may be kept within a desired range of temperatures while avoiding areas of relatively higher or lower temperatures. Insulation packs may also beneficially aid in reducing the energy needed to maintain a tank at a desired temperature due to the reduced heat loss zones about tank provided by the positioning of the insulation packs against the sides of tank. In particular embodiments, an insulation pack assembly comprising a diffuser housing containing an insulation pack may be mounted to an evaporator coil assembly within a storage unit having two thermostats, with one thermostat activating a fan assembly to cool the interior, and the second thermostat activating a condensing unit based on monitored temperature of the insulation pack. Such an arrangement enables the interior to be maintained at a desired temperature while decreasing energy consumption by limiting operation of the condensing unit.

These and other objects, advantages, purposes and features of this invention will become apparent upon review of the following specification in conjunction with the drawings.

BRIEF DESCRIPTION OF THE DRAWINGS

FIG. 10 is an exploded perspective view of the insulation pack assembly employed with the temperature maintenance storage unit of FIG. 8 shown in relation to the evaporator coil unit; and FIG. 11 is a perspective view of an alternative insulation pack assembly in accordance with the present invention.

DESCRIPTION OF THE PREFERRED EMBODIMENTS

Figure 1:
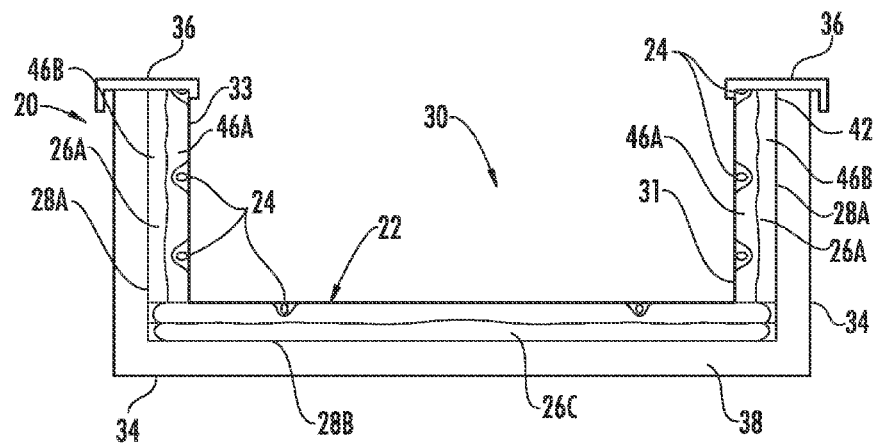
FIG. 1 is a cross sectional view through a temperature maintenance storage unit in accordance with the present invention.

The present invention will now be described with reference to the accompanying figures, wherein the numbered elements in the following written description correspond to like-numbered elements in the figures. A temperature maintenance unit in accordance with the present invention is illustrated as a refrigeration unit at 20 in FIG. 1 and includes a goods storage member, constructed as a refrigeration tank 22, which is generally surrounded by temperature coils or refrigeration coils 24, insulation containers or insulation packs 26 and insulation boards 28. The illustrated insulation packs 26 include both side insulation packs 26a, 26b and a bottom insulation pack 26c. Similarly, the illustrated insulation boards 28 include both side insulation boards 28a, 28b and a bottom insulation board 28c.

As described in more detail below, the insulation packs 26 are adapted to promote generally uniform temperatures within the interior 30 of tank 22 such that goods, such as food and drink items, stored or positioned within tank 22 may be kept within a desired range of temperatures while avoiding areas of relatively higher or lower temperatures. Thus, for example, food and drink items positioned at a lower portion 31 of tank 22 are not over cooled or frozen and, conversely, food and drink items positioned at an upper portion 33 of tank 22 may be adequately cooled. Similarly, food and drink items positioned within tank 22 at areas that are in closer proximity to refrigeration coils 24 are not over cooled or frozen and, conversely, food and drink items positioned within tank 22 at areas that are not in proximity to refrigeration coils 24 may still be adequately cooled The illustrated refrigeration unit 20 also includes an outer wall or case 34 and an upper cap or ridge 36. Case 34, cap 36, and tank 22 define an inner cavity 38 within which insulation packs 26, insulation boards 28 and refrigeration coils 24 are contained adjacent the outer walls or sides 40 of tank 22. Although not shown, refrigeration unit 20 also includes various additional conventional equipment. Such equipment may include, for example, a compressor motor, condenser, fan, thermostat, and the like.

Figure 2:
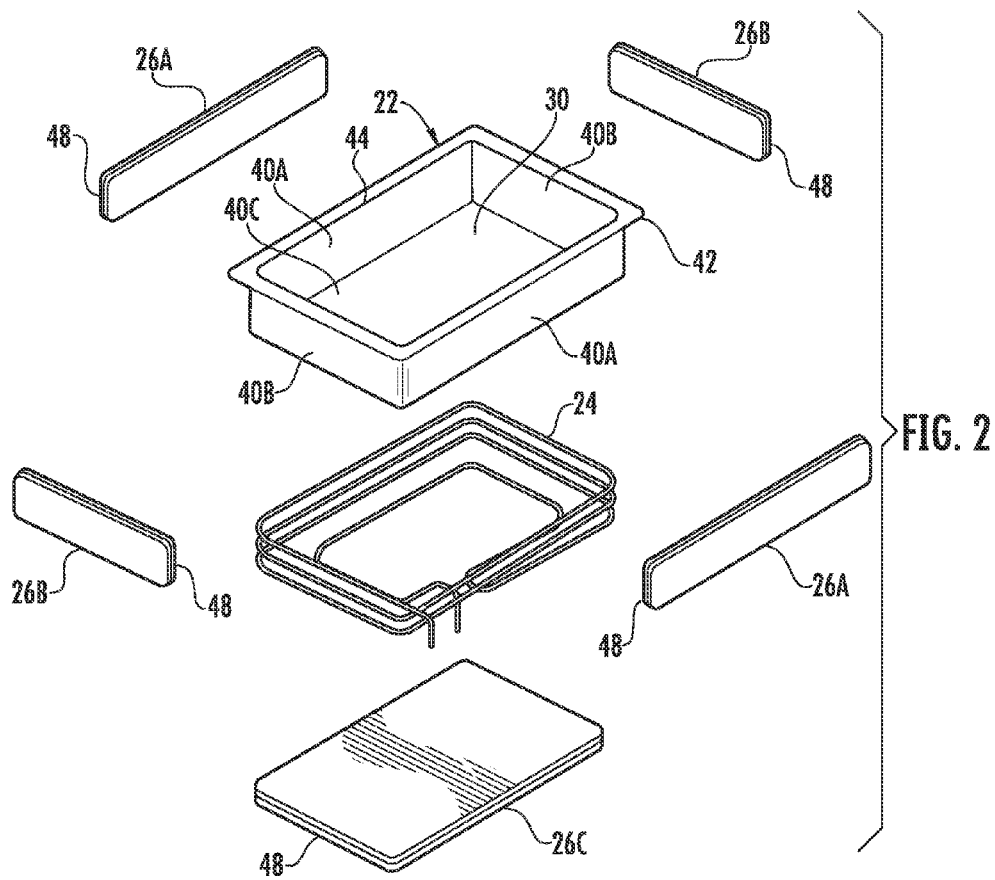
FIG. 2 is a partial exploded perspective view of the tank, temperature coils, and insulation packs of the temperature maintenance storage unit of FIG. 1.

Referring now to FIG. 2, tank 22 is shown to comprise multiple sides 40, including vertical sides 40a, 40b and a bottom side 40c, as well as a lip or edge 42 surrounding an upper opening 44. Tank 22 may be constructed of, for example, stainless steel, aluminum, a polymeric or plastic material, or other such material. Refrigeration coils 24 are positioned or wound about the sides 40 of tank 22 (FIG. 4), with coils 24 configured to enable a refrigerant, such as R22 or the like, to be conducted or to flow through the coils 24 to provide cooling to tank 22 and, in turn, to items stored therein.

Figure 4:
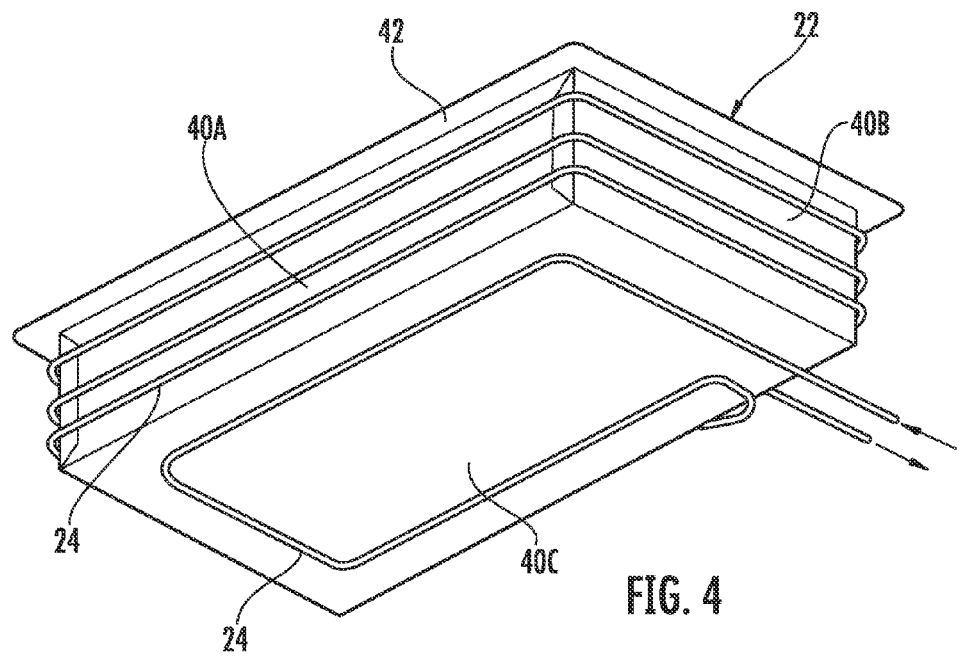
FIG. 4 is a bottom perspective view of the tank and temperature coils of the temperature maintenance storage unit of FIG. 1.

FIGS. 1, 2 and 4 illustrate that coils 24 are wrapped about tank 22 adjacent both vertical sides 40a, 40b and bottom side 40c. Coils 24, therefore, enable a refrigerant to be conducted about a greater surface area of tank 22 and promote a more uniform temperature distribution for tank 22, which is in turn imparted to contents of tank 22. In the illustrated embodiment, coils 24 are constructed of copper tubing that may be formed about tank 22. However, coils may be alternatively constructed, such as from a plastic material of aluminum, and still function as intended.

As previously noted and understood from FIGS. 1 and 2, various insulation packs 26 are positioned adjacent sides 40 of tank 22, including side insulation packs 26a, 26b and a bottom insulation pack 26c. In the illustrated embodiment, due to the regular geometrical construction of tank, side insulation packs 26a are of substantially similar construction, as are side insulation packs 26b. When installed, as understood from FIG. 1, insulation packs 26 are positioned against sides 40 of tank 22 such that coils 24 are sandwiched there between.

Figure 3:
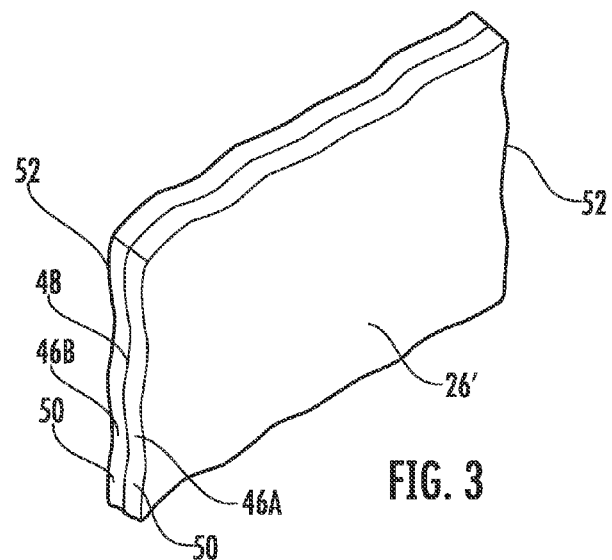
FIG. 3 is a perspective view of an insulation pack in accordance with the present invention.

Referring now to FIG. 3, a double walled or double thick insulation pack 26' generally representative of the construction of insulation packs 26a, 26b, and 26c is illustrated and is shown to include two compartments, or pouches, or pockets 46a and 46b separated by a divider or partition or pouch wall 48. Each pocket 46a, 46b is constructed to contain a temperature control fluid, such as a gel 50, that is able to flow or conform about objects, and is selected to transfer heat from the tank 22, such as by conduction and/or convection.

The pockets 46a, 46b and pouch wall 48 of insulation pack 26' may be constructed from a flexible polymeric or plastic material to enable the insulation pack 26' to conform about, for example, the coils 24. Ends 52 of insulation pack 26' are sealed, such as by heat sealing, to generally permanently enclose the gel 50 within the pockets 46a, 46b. In the illustrated embodiment, gel is a non-toxic, food grade gel refrigerant, such as may be supplied by the Cold Ice, Inc. of Oakland, Calif. However, it should be understood that alternative types of temperature control fluids and gels may be employed and still function as intended within the scope of the present invention.

Referring again to FIG. 1, as noted above, insulation packs 26 are positioned against sides 40 of tank 22 such that coils 24 are sandwiched there between. Refrigerant flowing through coils 24 chills gel contained within the pockets of insulation packs 26, with the gel and pockets of insulation packs 26 not shown in FIG. 1, but being of generally like construction to gel 50 and pockets 46a, 46b of insulation pack 26'. Sufficient chilling of insulation packs 26 by coils 24 causes the gel contained within the pockets to reach a generally uniform temperature, which temperature may be controlled by a thermostat device, or the like, on the refrigeration unit 20.

Notably, in the illustrated embodiment, the insulation packs 26 contact a significantly higher amount of surface area of sides 40 of tank 22 as compared to coils 24. Thus, when the gel contained within insulation packs 26 reaches a generally uniform temperature, the sides 40 of tank 22 are also caused to reach a generally uniform temperature such that the interior 30 of tank 22 may also be maintained at a generally uniform temperature. This aids in avoiding the problem of cold spots within the tank 22 at locations adjacent a refrigeration coil 24 and relatively warmer spots at locations between coils 24. Insulation packs 26 may also beneficially aid in reducing the energy needed to maintain tank 22 at a desired temperature due to the reduced heat loss zones about tank 22 provided by the positioning of the insulation packs 26 against the sides 40 of tank 22.

The inclusion of pouch wall 48 between pockets 46a, 46b of insulation pack 26' aids in the initial removal of heat, or pull down, of a tank 22 from a starting temperature to a desired set temperature. Pouch wall 48 creates a temporary resistance to heat transfer between the gel 50 of pockets 46a and 46b. Thus, when refrigerant initially flows through coils 24 the refrigerant initially chills gel 50 contained within pocket 46a such that pocket 46a is cooled down more quickly than pocket 46b. Thus, due to the inclusion of pouch wall 48, pocket 46a is able to be cooled down from an initial starting temperature to a lower set temperature more quickly than an alternative insulation pack without such a pouch wall having an equivalent volume of gel as insulation pack 26'. Insulation packs 26' having pockets 46a, 46b separated by pouch wall 48, therefore, enable tank 22 to be cooled down more quickly for storage of goods, such as food and drink items. Upon continued cooling the relative temperature difference between the gel contained within pockets 46a and 46b is eliminated.

In the illustrated embodiment, each insulation pack 26a, 26b, 26c includes two pockets, such as pockets 46 of insulation pack 26', with the same temperature control fluid formulation contained within each pocket. Further, as understood from FIG. 3, the illustrated pockets 46a, 46b are constructed to have generally comparable volumes of gel 50 such that the pockets 46a, 46b may be of approximately equivalent thicknesses.

It should be appreciated, however, that numerous alternative insulation pack and pocket arrangements may be employed and still function as intended within the scope of the present invention. For example, the pockets of an insulation pack may contain different temperature control fluid formulations and/or may be constructed to have differing thicknesses relative to each other. In the case of differing gel formulations, the gel may be intended for use at differing temperature ranges, such as above 30 degrees Fahrenheit for refrigeration temperature applications and above 10 degrees Fahrenheit for freezing temperature applications.

A temperature maintenance storage unit may also include insulation packs having differing temperature control fluid formulations. In the case of a tank such as tank 22, for example, insulation packs having one gel formulation may be placed adjacent the vertical sides of a tank and an insulation pack having an alternative gel formulation may be placed adjacent the bottom side of the tank. Additionally or alternatively, not all of the temperature coils of a side need be covered with insulation packs.

Still further, one or more, or even all, of the insulation packs used may not employ a pouch wall such that only one pocket is present, or may include additional pouch walls to form more than two pockets in either a layered or honeycomb arrangement. Such alternatively constructed insulation packs may be used to further control and/or maintain the uniformity of the temperatures within tank. For example, a refrigeration unit may be constructed having a tank adapted to hold food items that should be maintained at differing temperatures. In which case, alternatively configured insulation packs may be employed to aid in creating different zones of uniform temperature within the tank. In the case of an insulation pack having more than two pockets, one pocket may be positioned against the side of a tank, another pocket may be facing outwards away from the tank, with either a third or additional pockets positioned between the two aforementioned pockets.

Further, a double walled insulation pack may also be constructed, for example, by folding a single walled insulation pack over upon itself to create a double layer, or separate individual insulation packs may be positioned side-by-side in a stacked arrangement to create a double walled insulation pack. It should also be understood that multiple insulation packs may be applied to a side of a tank in a non-stacked arrangement wherein each insulation pack contacts the tank side. A single insulation pack may also be constructed to cover more than one side of a tank.

As noted, due to the regular geometrical construction of tank, side insulation packs 26a are of substantially similar construction to one another, as are side insulation packs 26b. It should be appreciated, however, that insulation packs having differing lengths and heights may be used with alternatively configured or shaped tanks. Further, although the illustrated insulation packs are shown to have a generally equivalent surface area and shape to the side to which the insulation pack is adjacently placed, alternative insulation packs may be configured that are of a different size or shape for placement against a tank side to cover up less than the entire surface area of a given side.

Still further, a temperature maintenance unit may be constructed wherein insulation packs are not placed adjacent each of the sides of the tank, or are not placed against substantially the entire surface area of a given side. In addition, although refrigeration coils are shown as being sandwiched between insulation packs and tank in the illustrated embodiment, coils may alternatively be placed or wound about insulation packs placed against the sides of tank such that the insulation packs are sandwiched between the tank and coils. Still further, coils may even be sandwiched between two insulation packs or the pockets of an insulation pack.

Referring again to FIG. 1, insulation boards 28 are positioned adjacent insulation packs 26. In the illustrated embodiment insulation boards 28a, 28b, 28c are provided against each vertical side 40a, 40b and the bottom side 40c and are formed from a Styrofoam or an expanding foam. As noted above, the gel 50 contained within insulation packs 26 is able to flow or conform against the sides 40 of tank 22 and/or around coils 24. Insulation boards 28 thus provide support to insulation packs 26 to maintain the thickness of the gel 50 within the insulation packs 26 and maintain the insulation packs 26 against the sides 40 of the tank 22. Insulation boards 28 alternatively and/or additionally, may aid in inhibiting heat transfer between the outer surface of an insulation pack 26 that is directed or facing away from the tank 22.

Alternatively, however, insulation boards 28 may not be included or may be constructed of an alternative material, such as a polymeric or plastic material, for example. Further, insulation boards may be alternatively constructed of a flexible material that wraps around the tank to hold and maintain the insulation packs, such as a netting, or foil, or film wrap. Still further, alternative insulation packs may include numerous pouches or pockets, such as a honeycomb formation, such that the gel is generally constrained from flowing within the insulation pack.

Although the temperature maintenance unit described above is in reference to a refrigeration unit, it should be appreciated that the unit may alternatively be employed as a heating unit. For example, rather than a coolant being conducted or flowing through coils 24, a heating medium, such as a hot liquid, or the like, may be circulated through coils, or the coils may be formed as or contain heating elements such as heating wires. In the case of heating wires, for example, the heat transfer medium circulating through the coils may be an electrical current. In the case of a heating unit, insulation packs will function in similar manner described above to aid in providing uniform temperatures within the tank, but will transfer heat to the tank, such as by conduction and/or convection It should also be appreciated that numerous alternative embodiments of temperature maintenance units may be constructed to include insulation packs with or without insulation boards and still function as intended within the scope of the present invention. For example, alternatively sized and/or shaped tanks, cases, and/or caps may be used with a temperature maintenance unit. Further, a slanted temperature maintenance unit may be constructed to hold and/or display goods at a position other than the horizontal orientation shown in FIG. 1.

An alternative temperature maintenance unit may also be constructed to include a goods storage member without upwardly extending vertical sides, or may merely include an upwardly extending lip of limited height. Such a goods temperature member may be utilized, for example, in a salad bar application to enable ready access to the contents. In such an embodiment, only a single side, such as a generally horizontal or slightly inclined bottom side, will be provided with one or more insulation packs. Still further, a temperature maintenance unit in accordance with the present invention may be constructed as an upright temperature maintenance unit, such as a refrigerator or retail store food display. Such an upright temperature maintenance unit may employ coils wound or positioned about the entire non-opening perimeter of the temperature maintenance unit and/or may employ insulation packs about the entire non-opening perimeter of the temperature maintenance unit. It should be appreciated, however, that such an embodiment may not include coils and/or insulation packs on a door or covering if employed.

Figure 5:
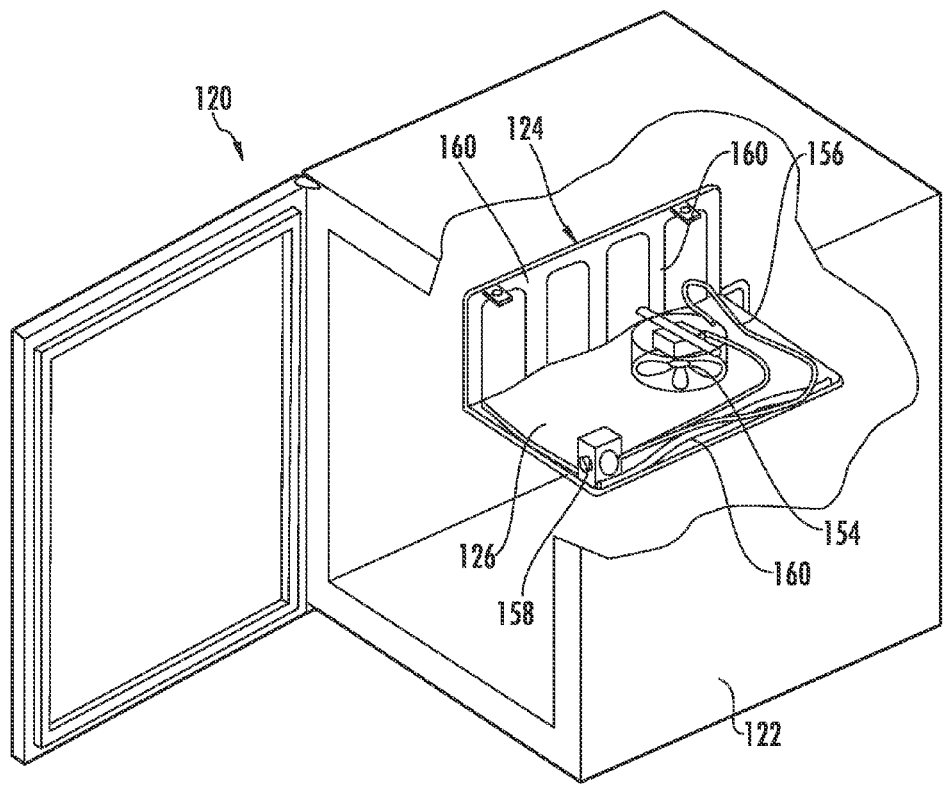
FIG. 5 is a perspective view of another temperature maintenance storage unit in accordance with the present invention having an insulation pack positioned adjacent an evaporator assembly with a portion of the exterior wall of the temperature maintenance storage unit removed for clarity.

Referring now to FIG. 5, an alternative temperature maintenance storage unit 120 is illustrated that includes an insulation pack 126 positioned adjacent a refrigeration coil or temperature coil constructed as an evaporator coil assembly 124 within the interior of a goods storage member formed as a refrigeration housing 122. In the illustrated embodiment, temperature maintenance storage unit 120 is formed as a compact refrigeration unit and also includes an evaporator fan assembly 154, a temperature probe 156, and a thermostat 158.

Insulation pack 126, which may be of similar construction to insulation packs 26 discussed above, is adapted to aid in the uniform cooling of the interior of temperature maintenance storage unit 120. Alternatively, however, an insulation pack having only a single pocket or single wall may be employed. In the illustrated embodiment, temperature probe 156 is in contact with insulation pack 126 and is configured to operate in connection with thermostat 158 to initiate operation of evaporator fan 154.

Evaporator coil assembly 124 may be formed as a stamped unit having interior channels 160 through which refrigerant may flow. Channels 160, therefore, create zones of relative lower temperature as compared to other locations of evaporator coil assembly 124. Insulation pack 126 is adapted to provide and/or create a uniform temperature distribution about evaporator coil assembly 124 by transferring heat from relative warmer locations to areas located adjacent channels 160 and may also tend toward being of a generally uniform temperature upon stabilization of the system. In addition, insulation pack 126 slows or inhibits evaporator coil assembly 124 from warming upon removal of coolant flowing through channels 160, which may decrease the frequency with which a compressor (not shown) of temperature maintenance storage unit 120 must be operated in order to maintain temperature maintenance storage unit 120 at a desired temperature. Evaporator fan assembly 154, which is adapted for convective cooling, is able to promote efficient cooling of the temperature maintenance storage unit 120 by creating air currents about and over insulation pack 126.

Figure 6:
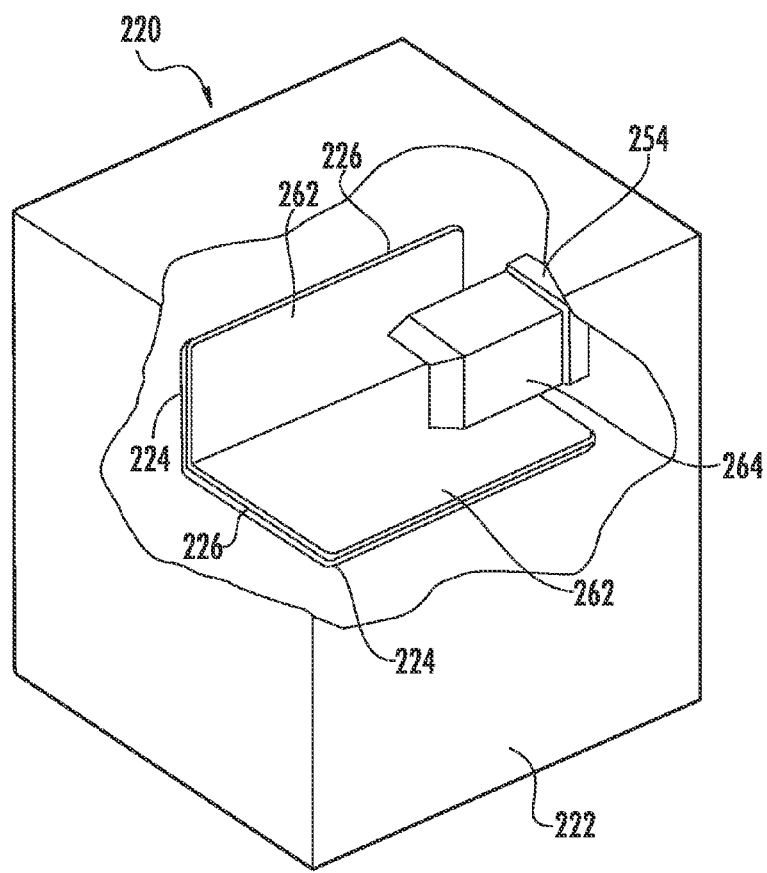
FIG. 6 is a perspective view of an alternative temperature maintenance storage unit in accordance with the present invention having an insulation pack positioned adjacent an evaporator assembly and incorporating a diffuser with a portion of the exterior wall of the temperature maintenance storage unit removed for clarity.
Figure 6A:
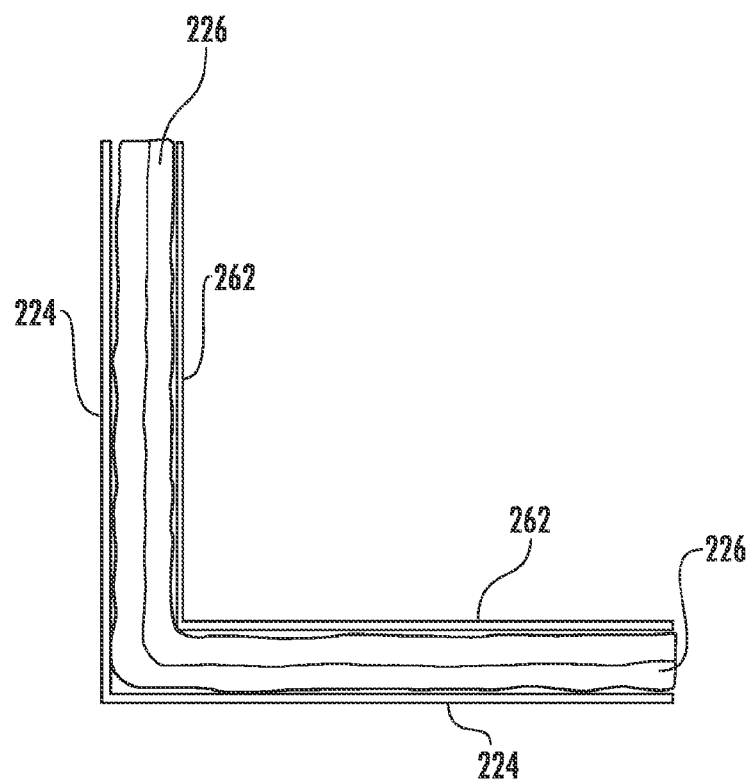
FIG. 6A is an end view of the insulation pack, evaporator assembly, and diffuser of FIG. 6.

Referring now to FIGS. 6 and 6A, another alternative temperature maintenance storage unit 220 is illustrated that includes an insulation pack 226 positioned adjacent an evaporator coil assembly 224 within an interior of a goods storage member formed as a refrigeration housing 222. Temperature maintenance storage unit 220 further incorporates a diffuser 262 and a baffle 264, as described in more detail below. In the illustrated embodiment, temperature maintenance storage unit 220 is also formed as a compact refrigeration unit and includes a fan assembly 254. Insulation pack 226, which may be of similar construction to insulation packs 26 discussed above, is adapted to aid in the uniform cooling of the interior of temperature maintenance storage unit 220.

As shown, insulation pack 226 is sandwiched between evaporator coil assembly 224 and diffuser 262. In the illustrated embodiment, diffuser 262 is formed as an aluminum plate and operates to aid in the conductive and convective cooling of temperature maintenance storage unit 220. For example, without a diffuser in some instances fan assembly may create a sufficiently localized cooling zone on insulation pack due to a particular directional air flow from fan assembly that a localized portion of insulation pack may freeze. Diffuser 262 operates, at least in part, to prevent such localized freezing of insulation pack 226 by creating a larger area over which air currents from fan assembly 254 may pass. Diffuser 262 also operates to provide uniform conductive cooling to insulation pack 226. In the illustrated embodiment, baffle 264 is provided to further direct or channel such air currents over diffuser 262. It should be appreciated, however, that a temperature maintenance storage unit may include a diffuser and not include a baffle and vice versa.

Figure 7:
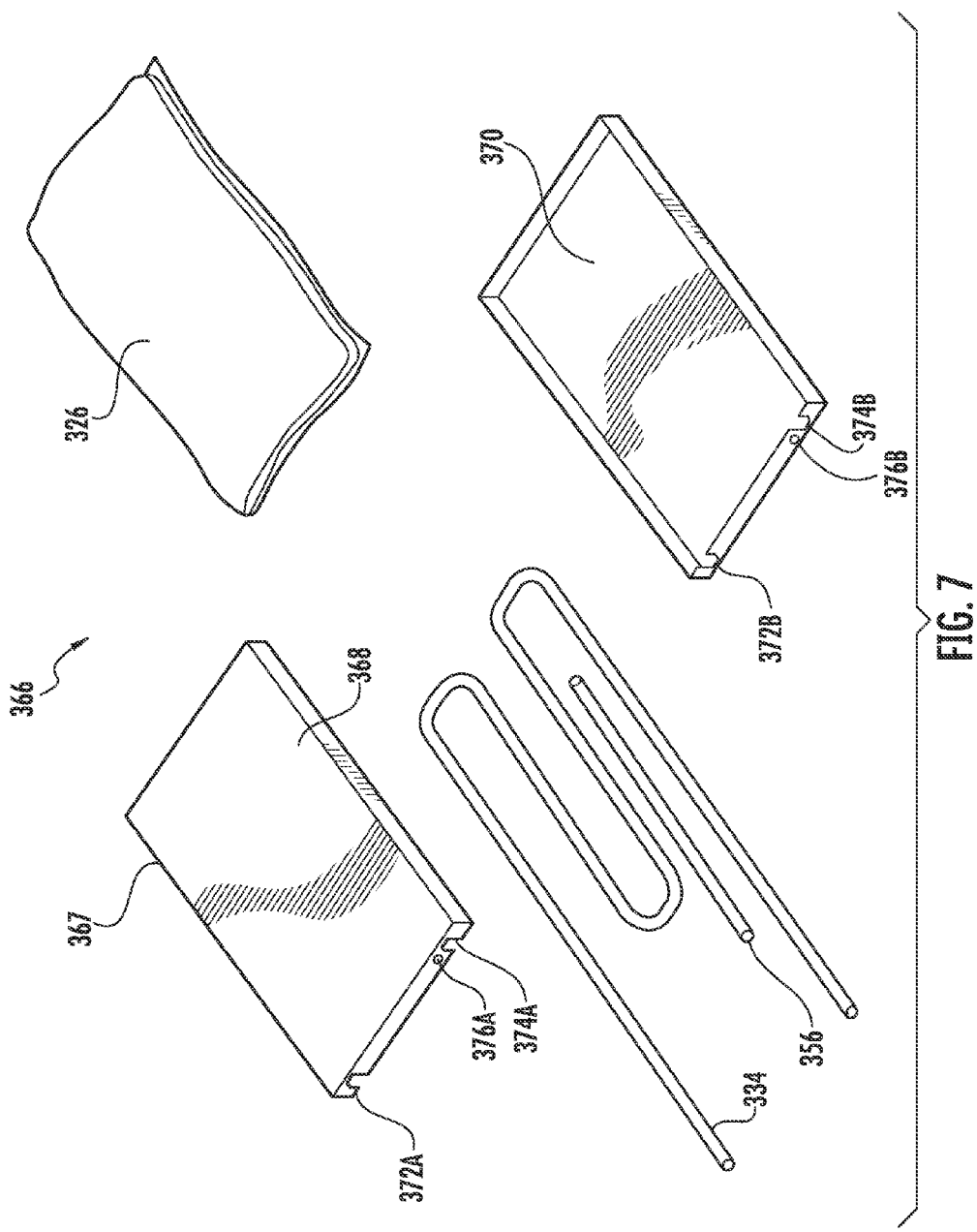
FIG. 7 is an exploded perspective view of an alternative arrangement of an insulation pack and diffuser in accordance with the present invention.

Referring now to FIG. 7, an alternative insulation pack assembly 366 is illustrated for use with a temperature maintenance storage unit. As shown, insulation pack assembly 366 includes a housing or diffuser housing 367 having a first housing member 368 and a second housing member 370, both of which are formed of aluminum in the illustrated embodiment, and an insulation pack 326. Insulation pack assembly 366 is adapted to encase, for example, a refrigeration coil 334 and a temperature probe tube 356 of the temperature storage unit. First and second housing units 368, 370 include apertures or openings 372a, 372b, respectively, for the inlet and outlet of the refrigeration coil 334, as well as apertures or openings 376a, 376b, respectively, for the temperature probe 356.

In similar manner to diffuser plate 262 described above for temperature maintenance storage unit 220, low velocity air provided by a fan assembly (not shown) over aluminum housing 367 will provide cooling to the interior of the temperature maintenance storage unit within which the insulation pack assembly 366 is employed. Notably, housing 367 provides a greater surface area, relative to the refrigeration coil 334 by itself, over which the air currents generated by the fan assembly may contact and, thus, improves the convective cooling of the air currents and, in turn, improves the cooling of the interior of the temperature maintenance storage unit. In addition, insulation pack 326 increases the surface area contact with the housing 367 to promote the conductive cooling of housing 367. Further, as discussed above, insulation pack 326 may decrease the frequency with which a compressor (not shown) must operate and thereby may improve the efficiency of a temperature maintenance storage unit employing such an insulation pack assembly 366. Insulation pack 326 may also provide temporary cooling to the interior of the temperature maintenance storage unit in the event of a power outage. In the illustrated embodiment, insulation pack 326 is sized such that it may be folded around or about the refrigeration coil 334 and temperature probe 356. Alternatively, however, insulation pack 326 may be of substantially similar construction to insulation packs 26 above, or may simply be constructed as a single layer that is not intended to be folded about or around the refrigeration coil and temperature probe. Still further, two separate insulation packs may be employed to sandwich the refrigeration coil and temperature probe there between.

Figure 8:
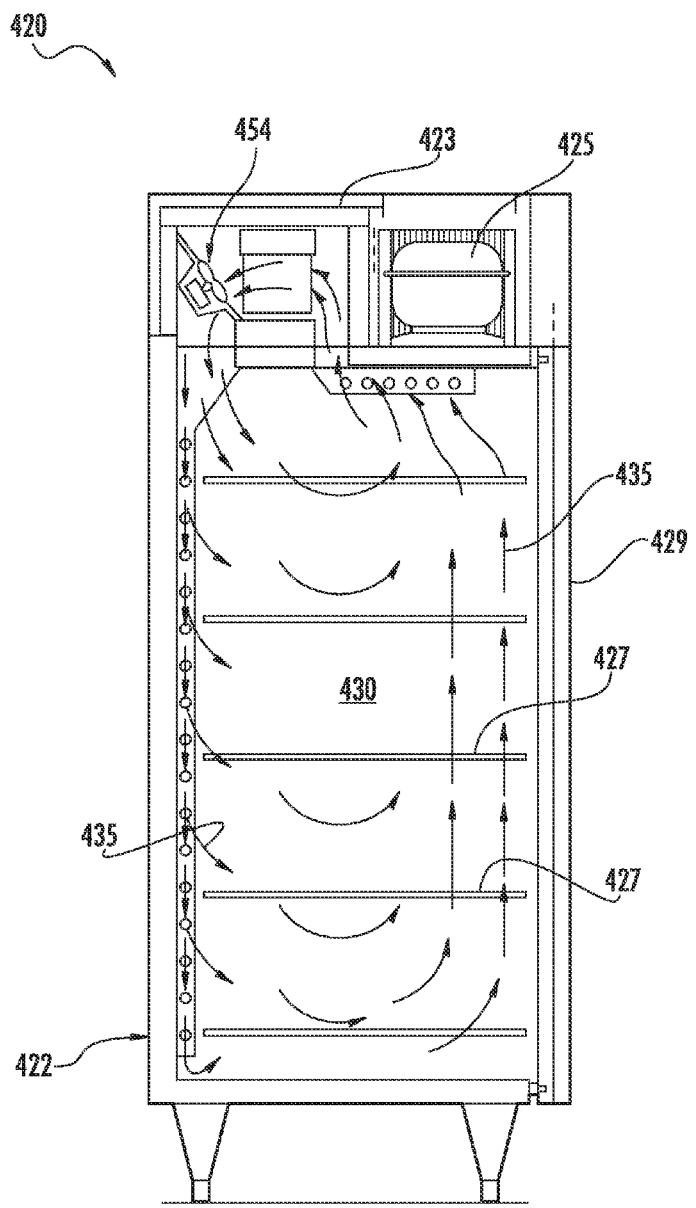
FIG. 8 is a side elevation view of an alternative temperature maintenance storage unit in accordance with the present invention with an exterior side of the temperature maintenance storage unit removed for clarity.
Figure 9:
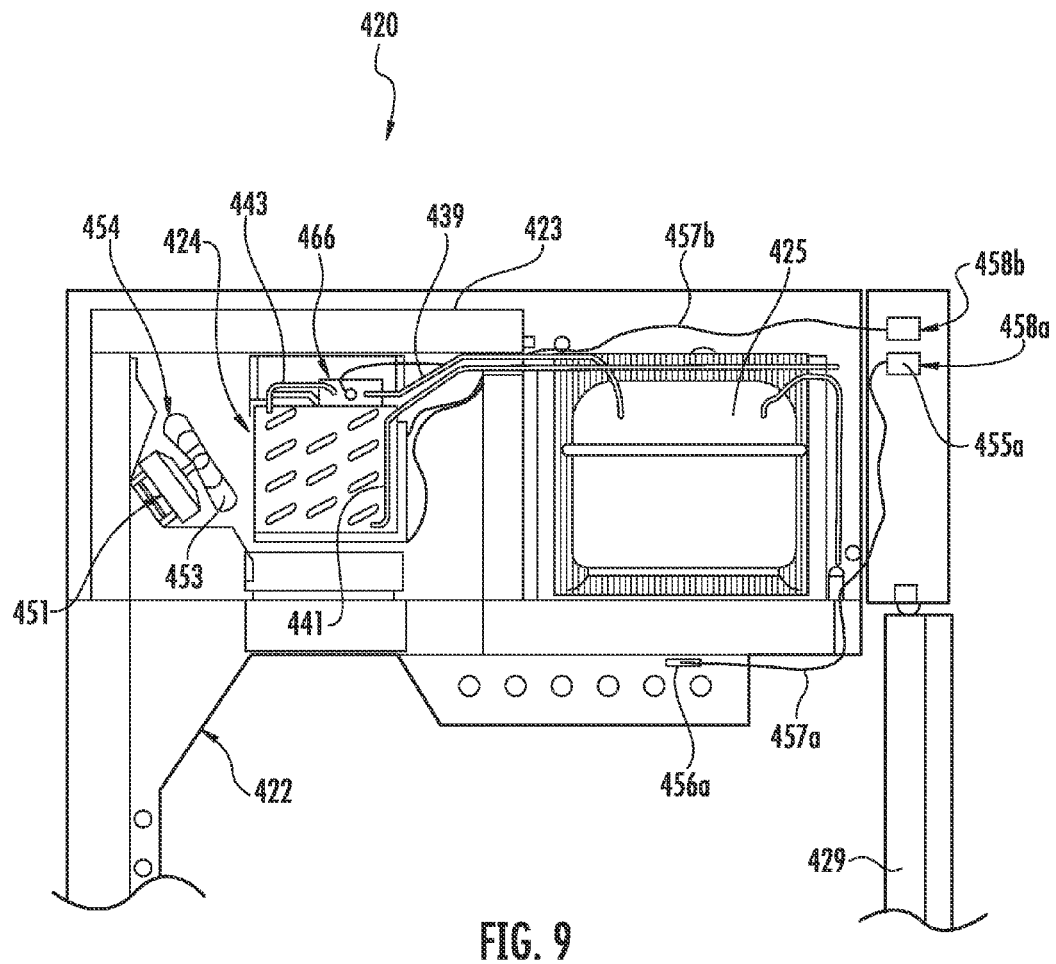
FIG. 9 is a close up, partial side elevation view of the temperature maintenance storage unit of FIG. 8.

An alternative temperature maintenance storage unit is disclosed in FIGS. 8-10, with storage unit 420 comprising a goods storage member constructed as an upright refrigeration unit 422 employing a refrigeration storage assembly or insulation pack assembly 466. Refrigeration unit 422 itself comprises a modified conventional upright unit, modified as described below, such as may be used in commercial environments, such as restaurants or food retailers, or in residential consumer applications, and includes a finned evaporator coil assembly 424 and an evaporator fan assembly 454, which are both contained within an insulated evaporator housing 423, as well as includes a compressor or condensing unit 425. Food or drink items are placed within the interior 430 of storage unit 420 on racks or wire shelving 427 and are accessed via door 429. As shown in FIG. 8, fan assembly 454 circulates cooling air flow 435 through evaporator coil assembly 424 and interior 430, with fan assembly 454 including a motor 451 for operating fan 453. Although a single fan assembly 454 is shown, it should be appreciated that refrigeration unit 422 may include multiple fan assemblies of like construction.

Insulation pack assembly 466 is affixed to evaporator coil assembly 424 such that insulation pack assembly 466 is in direct contact with the fins 437 (FIG. 10) of evaporator coil assembly 424. A copper evaporator line or refrigerant coil or tube 439 extends from the condensing unit 425 to the insulation pack assembly 466, functioning as a supply line or coil or tube and an additional copper evaporator line or refrigerant coil or tube 441, operating as a return line or coil or tube, extends from the evaporator coil assembly 424 back to the condensing unit 425. As described below, an additional copper evaporator line or refrigerant coil or tube 434 passes through insulation pack assembly 466 such that the refrigerant may be delivered from the compressor 425, into and through the insulation pack assembly 466, and then from the insulation pack assembly 466 to the evaporator coil assembly 424 via refrigerant line or tube 443.

Refrigeration unit 420 includes two thermostats or thermostat assemblies, with one thermostat assembly 458a monitoring the temperature of the interior 430 of refrigeration unit 422, and the other thermostat assembly 458b monitoring the temperature of insulation pack assembly 466. Thermostat assembly 458a includes a thermistor probe or temperature probe 456a mounted within interior 430, a thermostat base unit 455a, and a signal wire 457a connecting probe 456a with thermostat base unit 455a. Likewise, thermostat assembly 458b includes a thermostat base unit 455b and a thermistor probe 456b (partially shown in FIG. 10), with the probe 456b installed within insulation pack assembly 466 as described below and the probe 456b and thermostat base unit 455b being connected by signal wire 457b. Accordingly, thermostat 458a operates as an interior thermostat and thermostat 458b operates as an insulation pack thermostat. Thermostat assemblies 458 are White-Rodgers Model 1609-101 refrigeration temperature controls in the illustrated embodiment, however, alternative thermostat assemblies may be employed.

Referring now to FIG. 10, it will be understood that refrigeration storage assembly or insulation pack assembly 466 is of similar construction to insulation pack assembly 366 of FIG. 7, and includes a housing or diffuser housing 467 having a first housing member 468 and a second housing member 470, both of which are formed of aluminum in the illustrated embodiment, and a sealed, flexible insulation pack 426 that is internally contained within housing 467 when first housing member 468 and second housing member 470 are assembled together. Insulation pack assembly 466 is also adapted to encase evaporator line or refrigerant coil 434 and copper temperature probe tube 456, with the insulation pack 426 being disposed about refrigerant coil 434 and temperature probe tube 456. In the illustrated embodiment, insulation pack 426 is sized such that it may be folded around or about the refrigerant coil 434 and temperature probe tube 456. As also understood from FIG. 10, thermistor probe 456b of thermostat assembly 458b projects from temperature probe tube 456 such that when insulation pack assembly 466 is assembled, thermistor probe 456b will be in direct contact with insulation pack 426.

Alternatively, an insulation pack may be of substantially similar construction to insulation packs 26 above, or may simply be constructed as a single layer that is not intended to be folded about or around the refrigeration coil and temperature probe tube. Still further, two separate insulation packs may be employed to sandwich the refrigeration coil and temperature probe tube there between. First and second housing members 468, 470 include apertures or openings 472a, 472b, and 474a, 474b respectively, for the inlet and outlet of the refrigeration coil 434, as well as apertures or openings 476a, 476b, respectively, for the temperature probe tube 456.

With reference to FIGS. 9 and 10, insulation pack assembly 466 is compressed together and affixed directly to fins 437 of evaporator coil assembly 424, such as by a zip tie 459 or the like, and thermistor probe 456b of thermostat 458b is inserted within temperature probe tube 456 such that thermostat 458b is able to monitor the temperature of insulation pack 426 and, therefore, insulation pack assembly 466. Insulation pack assembly 466 is mounted to evaporator coil assembly 424 while still enabling air flow to pass through fins 437 for convective heat transfer and cooling of air flow 435.

With further reference to FIGS. 9 and 10, evaporator line 439 from condensing unit is connected to the inlet of refrigerant coil 434 of insulation pack assembly 466, and the outlet of refrigerant coil 434 of insulation pack assembly 466 is connected to an inlet on evaporator coil assembly 424 by tube 443. In turn, the outlet of evaporator coil assembly 424 is connected to the return line 441 between evaporator coil assembly 424 and condensing unit 425. Copper tubing is used for the various refrigerant lines in the illustrated embodiment. Although described as comprising separate lines, it should be appreciated that the lines are connected together to operate as a single line, or that various of the lines may be alternatively constructed as a single line.

In operation, condensed refrigerant is sent from condensing unit 425 through evaporator line 439 to insulation pack assembly 466, where the refrigerant passes through evaporator line 434, thereby cooling insulation pack 426. The refrigerant continues out of insulation pack assembly 466 and into evaporator coil assembly 424 where expansion creates further cooling of evaporator coil assembly 424 such that air flow 435 generated by fan assembly 454 is cooled by passing between fins 437 and is subsequently able to cool interior 430.

During operation, fan assembly 454 and/or condensing unit 425 are selectively activated based on temperatures of interior 430 and insulation pack assembly 466, as monitored by the dual thermostats 458a, 458b, to provide for increased efficiency and correspondingly lower cost operation of refrigeration unit 422. In the illustrated embodiment, for example, thermostat 458b is used in the maintenance of the temperature of insulation pack 426 to between approximately 18 degrees and 30 degrees Fahrenheit (F) by cycling condensing unit 425 on and off, with thermostat 458a being used in the maintenance of the temperature of interior 430 to between approximately 36 degrees and 40 degrees F. by cycling fan assembly 454 on and off Condensing unit 425 and fan assembly 454 may initially be operated to obtain the desired temperatures of insulation pack assembly 466 and interior 430, and then be deactivated upon obtaining the desired temperatures.

Insulation pack assembly 466, and the direct contact with fins 437 of evaporator coil assembly 424, provides for heat transfer between fins 437 and insulation pack assembly 466 to maintain the temperature of fins 437 at a decreased temperature, with insulation pack 426 of insulation pack assembly 466 acting as a cold source to aid in maintaining and prolonging the decreased temperature. Thus, the temperature of interior 430 may be maintained by cycling fan assembly 454 on and off upon thermostat 458a detecting a preset temperature of interior 430 without operation of condensing unit 425, with fan assembly 454 drawing air through fins 437 of evaporator coil assembly 424 and fins 437 being maintained at a prolonged decreased temperature via heat transfer between insulation pack assembly 466 and fins 437. Upon thermostat 458b detecting that the temperature of insulation pack 426 has risen above a preset limit, condensing unit 425 is activated to re-cool insulation pack assembly 466. This process allows interior 430 of refrigeration unit 422 to be maintained for extended periods of time with decreased operation of condensing unit 425, thus increasing the efficiency of refrigeration unit 422.

In the illustrated embodiment insulation pack 426 contains a food grade refrigerant gel with a performance range from 30 degrees F. to 40 degrees F., with the temperature of insulation pack 426 being maintained between approximately 18 degrees F. and 32 degrees F. by the cycling on and off of condensing unit 425 by thermostat 458b, and with interior 430 temperature being maintained between approximately 36 degrees F. and 40 degrees F. by cycling on and off of evaporator fan assembly 454 via thermostat 458a. In operation, condensing unit 425 will not be activated while thermostat 458b monitors a temperature of between 18 degrees F. and 32 degrees F. for insulation pack 426. Upon thermostat 458a detecting a temperature of 40 degrees F. within interior 430, however, thermostat 458a will activate fan assembly 454 to provide for cooling within refrigeration unit 422, until an interior 430 temperature of approximately 36 degrees F. is obtained, for example, thus cooling interior 430 without operation of condensing unit 425. Upon thermostat 458b detecting an insulation pack 426 temperature of 30 degrees F., thermostat 458b will activate condensing unit 425 to cool insulation pack 426 until insulation pack 426 reaches a temperature of 18 degrees F.

In one arrangement of the illustrated embodiment, cold transfer, via heat transfer mechanics, between insulation pack assembly 466 and coil fins 437 maintained fins 437 at a temperature of between 15 degrees F. and 35 degrees F. for extended periods of time, between approximately five and 20 minutes, depending on the stabilized temperature within refrigeration unit 422 and without operation of condensing unit 425. Moreover, because only a portion of the cold reserve capacity of the gel refrigerant within insulation pack 426 was used during the condensing unit 425 off cycle, condensing unit 425 needed only to operate for approximately two minutes to obtain the desired temperature of insulation pack 426, which was approximately half the operation time required for a comparable conventional refrigeration unit without insulation pack assembly 466.

Alternatively configured storage units operating as freezers may be constructed in accordance with the present invention. For example, alternative insulation packs with refrigerant gels having colder performance range may be employed, such as a gel having a performance range of 10 degrees F. to 20 degrees F. to maintain products from approximately 20 degrees F. to 30 degrees F., or a gel having a performance range of minus 10 degrees F. to 0 degrees F. to maintain products from approximately 0 degrees F. to 10 degrees F.

It should also be appreciated that alternative storage units in accordance with the present invention may be constructed for use with alternatively configured refrigeration units, for example, having alternatively configured or located evaporator coil assemblies. Moreover, alternatively configured insulation pack assemblies may also be employed. For example, alternatively shaped and sized diffuser housings may be utilized. Such insulation pack assemblies may also be alternatively mounted to an evaporator coil assembly, such as by way of a stainless steel strap, or the like, with the insulation pack assembly contacting the fins while still allowing air flow through the fins of the evaporator coil assembly. A conventional defrost heater (not shown) may also be included with a storage unit, depending on the humidity levels during operation, to remove condensation from the evaporator coil assembly as needed.

FIG. 11 discloses an alternative insulation pack assembly 566 that is of substantially similar construction to insulation pack assembly 466 of FIGS. 8-10. Insulation pack assembly 566 is shown mounted to evaporator coil assembly 424 via bands 559, with diffuser housing 567 being in direct contact with the entire upper plane of fins 437, with fins 437 defining four planes that are generally orthogonal relative to one another. Air currents generated by a fan assembly (not shown) are able to pass through fins 437 of evaporator coil assembly without being blocked by insulation pack assembly 566.

As shown, refrigerant line 539 delivers refrigerant from the compressor (not shown) into the insulation pack assembly 566, whereat the refrigerant is passed through tubing that is in direct contact with an insulation pack (not shown) of similar construction to insulation pack 426. The refrigerant than exits the insulation pack assembly 566 and is delivered into the evaporator coil assembly 424 via refrigerant line 543. The refrigerant is passed through the evaporator coil tubing 445, the ends of which are shown in FIG. 11, such that fins 437 are cooled. Finally, the refrigerant is delivered back to the compressor via return refrigerant line 541.

The present invention provides a temperature maintenance storage unit that may be constructed as a refrigeration unit or a heating unit for storing goods such as food and drink items. The temperature maintenance storage unit is provided with insulation packs containing a temperature control fluid, such as a gel, with the insulation packs being provided adjacent one or more of the sides of a tank of the temperature maintenance storage unit. Heating or cooling coils may be sandwiched between the insulation packs and tank and cause the temperature control fluid of the insulation packs to reach a generally uniform temperature. Because the insulation packs contact a significantly higher amount of surface area of the sides of the tank as compared to the coils, the insulation packs promote generally uniform temperatures within the interior of the tank such that food and/or drink items stored or positioned within the tank may be kept within a desired range of temperatures while avoiding areas of relatively higher or lower temperatures. Insulation packs may also beneficially aid in reducing the energy needed to maintain a tank at a desired temperature due to the reduced heat loss zones about tank provided by the positioning of the insulation packs against the sides of tank. In particular embodiments, an insulation pack assembly comprising a diffuser housing containing an insulation pack may be mounted to an evaporator coil assembly within a storage unit having two thermostats, with one thermostat activating a fan assembly to cool the interior, and the second thermostat activating a condensing unit based on monitored temperature of the insulation pack. Such an arrangement enables the interior to be maintained at a desired temperature while decreasing energy consumption by limiting operation of the condensing unit.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which I claim an exclusive property or privilege are defined as follows:

1. A temperature maintenance storage unit, said temperature maintenance storage unit comprising:
   a goods storage member, said goods storage member including a fan assembly, an evaporator coil assembly having a plurality of fins, a compressor unit, and an interior within which goods may be stored, said fan assembly and said evaporator coil assembly being located within said interior with said fan assembly configured to selectively generate air currents over said evaporator coil assembly and within said interior;
   an insulation pack assembly, said insulation pack assembly comprising a sealed generally flexible insulation pack containing a temperature control fluid;
   a refrigerant line for conducting a refrigerant, said refrigerant line extending from said compressor unit, through said insulation pack assembly, and to said evaporator coil assembly, with said refrigerant line contacting said insulation pack of said insulation pack assembly;

an insulation thermostat probe and an interior thermostat probe, said insulation thermostat probe monitoring the temperature of said insulation pack assembly and said interior thermostat probe monitoring the temperature of said interior;

said insulation pack assembly being mounted directly to said evaporator coil assembly, and wherein said compressor unit is selectively activated in response to monitored temperatures of said insulation pack assembly by said insulation thermostat probe, and wherein said fan assembly is selectively activated in response to monitored temperatures of said interior by said interior thermostat probe.

2. The temperature maintenance storage unit of claim 1 wherein said insulation pack assembly further comprises a metallic member with said insulation pack contacting said metallic member, and wherein said metallic member is directly mounted to at least multiple ones of said fins of said evaporator coil assembly with said metallic member being positioned between and in contact with both said insulation pack and said evaporator coil assembly.

3. The temperature maintenance storage unit of claim 2 wherein said insulation pack assembly further comprises a diffuser housing with said metallic member comprising a portion of said diffuser housing and with said insulation pack being contained within said diffuser housing.

4. The temperature maintenance storage unit of claim 3 wherein said diffuser housing comprises a first housing member and a second housing member, with said metallic member comprising said second housing member and said insulation pack being contained between said first and second housing members.

5. The temperature maintenance storage unit of claim 3, wherein said insulation thermostat probe is located within said diffuser housing and contacts said insulation pack.

6. The temperature maintenance storage unit of claim 5, wherein said diffuser housing includes a thermostat probe tube extending into the interior of said diffuser housing, said insulation thermostat probe being inserted into said diffuser housing through said thermostat probe tube.

7. A method of maintaining the temperature within a temperature maintenance storage unit comprising:

monitoring the temperature of an insulation pack assembly, said insulation pack assembly comprising a sealed generally flexible insulation pack containing a temperature control fluid with said insulation pack assembly being mounted directly to the fins of an evaporator coil assembly located within the interior of a goods storage member;

activating a compressor unit when a compressor activation temperature is detected;

circulating refrigerant from said compressor unit through said insulation pack assembly, into said evaporator coil assembly, and back to said compressor unit when said compressor unit is activated;

monitoring the temperature of the interior of said goods storage member; and activating a fan assembly when a fan activation temperature is detected, with said fan assembly being selectively activated to generate air currents over said evaporator coil assembly without activation of said compressor unit when said fan activation temperature is detected and said compressor activation temperature is not detected.

8. The method of claim 7, further comprising the steps of:
deactivating said compressor unit when a compressor deactivation temperature is detected; and
deactivating said fan assembly when a fan deactivation temperature is detected.

9. The method of claim 8, wherein said fan activation temperature is approximately 40 degrees F. and said compressor activation temperature is approximately 30 degrees F., and wherein said fan deactivation temperature is approximately 36 degrees F. and said compressor deactivation temperature is approximately 18 degrees F.

10. The method of claim 7, further comprising an insulation thermostat probe in contact with said insulation pack assembly and an interior thermostat probe positioned within said interior, wherein said step of monitoring the temperature of said insulation pack assembly includes monitoring the temperature of said insulation pack assembly with said insulation thermostat probe, and wherein said step of monitoring said interior of said goods storage member includes monitoring the temperature of said interior of said goods storage member with said interior thermostat probe.

11. The method of claim 7, wherein said insulation pack assembly includes a diffuser housing with said insulation pack being contained within said diffuser housing, and wherein said refrigerant line extends into and out of said diffuser housing, with said insulation pack being in direct contact with said refrigerant line.

12. The method of claim 11, wherein said diffuser housing comprises a first housing member and a second housing member, with said insulation pack being contained between said first and second housing members.

13. The method of claim 11, wherein said evaporator coil assembly includes a plurality of fins and said diffuser housing is mounted directly to said fins.

14. The method of claim 7 including a temperature probe, and wherein said step of monitoring the temperature of an insulation pack assembly includes directly contacting said insulation pack with said temperature probe.

15. A temperature maintenance storage unit, said temperature maintenance storage unit comprising:

a goods storage member, said goods storage member including a fan assembly, an evaporator coil assembly having a plurality of fins, a compressor unit, and an interior within which goods may be stored, said fan assembly being located within said goods storage member and configured to selectively generate air currents over said evaporator coil assembly and within said interior;

an insulation pack assembly, said insulation pack assembly comprising a diffuser housing and a sealed generally flexible insulation pack containing a temperature control fluid with said diffuser housing including at least one metallic portion and said insulation pack being contained within said diffuser housing;

an insulation thermostat probe, said insulation thermostat probe positioned at said insulation pack assembly for monitoring the temperature of said insulation pack assembly;

an interior thermostat probe, said interior thermostat probe monitoring the temperature of said interior;

a refrigerant line extending from said compressor unit, through said insulation pack assembly, and to said evaporator coil assembly, with said refrigerant line contacting said insulation pack and conducting a refrigerant through said insulation pack assembly and to said evaporator coil;

said metallic portion of said diffuser housing being mounted directly to at least multiple ones of said fins of said evaporator coil assembly with said metallic portion of said diffuser housing being positioned between and in contact with both said insulation pack and said fins of said evaporator coil assembly, and wherein said compressor unit is selectively activated in response to monitored temperatures of said insulation pack assembly by said insulation thermostat probe, and wherein said fan assembly is selectively activated in response to monitored temperatures of said interior by said interior thermostat probe.

16. The temperature maintenance storage unit of claim 15 wherein said diffuser housing comprises a first housing member and a second housing member, with said insulation pack being contained between said first and second housing members and said second housing member being metallic and mounted directly to said fins.

17. The temperature maintenance storage unit of claim 15, wherein said insulation thermostat probe is in contact with said insulation pack.

18. The temperature maintenance storage unit of claim 17, further including a thermostat probe tube extending into the interior of said diffuser housing, said insulation thermostat probe being inserted into said diffuser housing through said thermostat probe tube.

* * * * *